(12) United States Patent
Ghosh et al.

(10) Patent No.: US 8,773,994 B2
(45) Date of Patent: Jul. 8, 2014

(54) SIGNALING METHOD AND APPARATUS TO ENABLE MULTIPLE ANTENNA COMMUNICATIONS IN WIRELESS SYSTEMS

(75) Inventors: Monisha Ghosh, Chappaqua, NY (US); Vasanth R. Gaddam, Tarrytown, NY (US)

(73) Assignee: Koninklijke Philips N.V., Eindhoven (NL)

( * ) Notice: Subject to any disclaimer, the term of this patent is extended or adjusted under 35 U.S.C. 154(b) by 140 days.

(21) Appl. No.: 13/263,136

(22) PCT Filed: Mar. 24, 2010

(86) PCT No.: PCT/IB2010/051296
§ 371 (c)(1),
(2), (4) Date: Oct. 6, 2011

(87) PCT Pub. No.: WO2010/116280
PCT Pub. Date: Oct. 14, 2010

(65) Prior Publication Data
US 2012/0039321 A1    Feb. 16, 2012

Related U.S. Application Data

(60) Provisional application No. 61/168,284, filed on Apr. 10, 2009.

(51) Int. Cl.
*G01R 31/08*    (2006.01)
(52) U.S. Cl.
USPC .......................... 370/232; 370/208; 370/338

(58) Field of Classification Search
USPC ......... 370/208–209, 338, 210, 401–428, 464, 370/474; 375/260, 232
See application file for complete search history.

(56) References Cited

U.S. PATENT DOCUMENTS

| | | | |
|---|---|---|---|
| 6,678,310 B1 * | 1/2004 | Andren et al. ................ 375/147 |
| 7,274,757 B1 * | 9/2007 | Zhou et al. .................... 375/340 |
| 7,929,409 B2 * | 4/2011 | Chitrapu et al. ............. 370/208 |
| 2001/0005406 A1 | 6/2001 | Mege |
| 2002/0114297 A1 * | 8/2002 | Karna et al. .................. 370/335 |
| 2004/0101068 A1 * | 5/2004 | Wang et al. ................... 375/324 |

FOREIGN PATENT DOCUMENTS

AW    WO2008038979 A2    4/2008

OTHER PUBLICATIONS

"Standard ECMA-368: High Rate Ultra Wideband PHY and MAC Standard", Dec. 2005, European Computer Manufacturers Association, ECMA International, Geneva, Switzerland, vol. 1, p. 7 p.19-p. 33, XP002591971.

* cited by examiner

*Primary Examiner* — Ricky Ngo
*Assistant Examiner* — Iqbal Zaidi
(74) *Attorney, Agent, or Firm* — Larry Liberchuk

(57) ABSTRACT

A method (200) for signaling a transmission mode in a wireless communication networks comprises selecting a signature sequence corresponding to the transmission mode of a transmitting device (S210); forming, for each antenna in the transmitting device, a synchronization field based on the selected signature sequence, wherein the synchronization field is included in a preamble (S220); and transmitting, from each antenna in the transmitting device, the data frame that comprises the preamble.

13 Claims, 4 Drawing Sheets

SIGNALING METHOD AND APPARATUS TO ENABLE MULTIPLE ANTENNA COMMUNICATIONS IN WIRELESS SYSTEMS

This application claims the benefit of U.S. Provisional Application No. 61/168,284 filed on Apr. 10, 2009.

The invention relates generally to multiple antenna communications in wireless systems.

Wireless devices with limited/restricted transmission power are well suited for wireless local area networks (WLANs) and wireless personal area networks (WPANs) applications. An example of such devices is portable cognitive devices defined in the Ecma 392 standard. A wireless device may be implemented to include a single antenna or multiple antennas. The latter configuration is typically utilized to increase the data rate and the transmission range. Thus, a typical network may include devices with a single antenna and multiple antennas. As a result, a transmitting device may include multiple antennas while the receiving device may include a single antenna.

In the related art many, variations of transmission schemes utilized by multiple antennas are discussed. Such transmission schemes include transmit beam-forming, space-time block codes (STBC), frequency interleaved transmit diversity (FITD), and the like. Regardless of the transmission scheme, the receiving device must know whether the transmission is performed using a single antenna or multiple antennas.

To this end, an explicit signaling procedure is performed to inform the receiving device of the transmission mode (single-antenna or multiple antennas). The transmission mode is explicitly designated in a header of a frame. The header is always being transmitted using a single antenna, whereby the header can be properly decoded by all receiving devices in the network. However, this requires the transmission of a preamble of the frame also using a single antenna. The explicit signaling procedure consumes bandwidth and power as the preamble and header should always be transmitted using a single antenna. Thus, this signaling procedure is inefficient.

Therefore, it would be advantageous to provide an efficient solution for signaling the transmission mode.

Certain embodiments of the invention include a method for signaling a transmission mode in a wireless communication networks. The method comprises selecting a signature sequence corresponding to the transmission mode of a transmitting device; forming, for each antenna in the transmitting device, a synchronization field based on the selected signature sequence, wherein the synchronization field is included in a preamble; and transmitting, from each antenna in the transmitting device, the data frame that comprises the preamble.

Certain embodiments of the invention also include an apparatus that comprises a memory for storing at least one signature sequence corresponding to a transmission mode and a transmission scheme; a synchronization field generator for forming a synchronization field for each antenna included in the apparatus by generating a short training sequence using the at least one signature sequence retrieved from the memory; a channel estimation (CE) field generator for forming a CE field for each antenna by generating a long training sequence, wherein the synchronization field and CE field are included in a preamble; a frame generator for generating a data frame for each antenna, the data frame comprising the preamble; and a modulator for modulating each data frame using the transmission scheme set for the apparatus.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
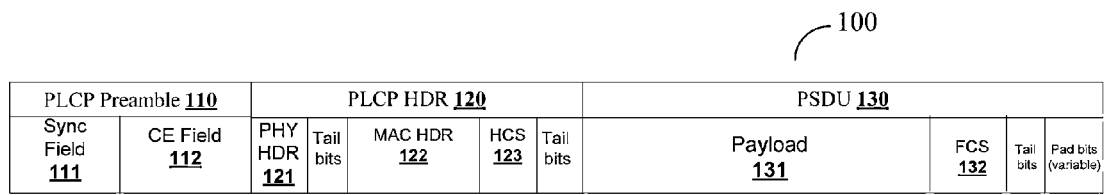
FIG. 1 is a diagram of a data frame structure.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 schematically shows a typical format of a data frame 100 utilized to describe the principles of the invention. The frame 100 is usually used in wireless networks, such as WLANs and WPANs to carry data to be transmitted. The frame 100 includes a physical layer convergence protocol (PLCP) preamble 110, a PLCP header (HDR) 120, and a PLCP service data unit (PSDU) 130. The exact contents and formats of PLCP preamble 110, PLCP header 120, and the PSDU 130 are application specific and defined by a transmission specification including, but not limited to, IEEE 802.11, IEEE 802.15, WiMedia, Ecma, and the like.

Commonly, the PLCP header 120 includes a physical (PHY) layer header 121, a medium access control (MAC) layer header 122, and a header check sequence (HCS) 123. Based on the content of the PLCP header 120, a receiving device is enabled to properly decode payload data. The PSDU 130 includes a payload data portion 131, received from a MAC layer, and a frame check sequence (FCS) 132 for detecting errors in the frame 100.

The PLCP preamble 110 is primarily used for burst/packet detection, time and frequency synchronization, beginning of frame detection, automatic gain control (AGC), and channel estimation. These tasks are accomplished by a synchronization field 111 and a channel estimation (CE) field 112. Specifically, the synchronization field 111 is used for AGC setting, burst detection, timing and frequency offset estimation, and frame detection in that order. The CE field 112 is used to determine the channel response and also for fine frequency estimation.

Figure 2:
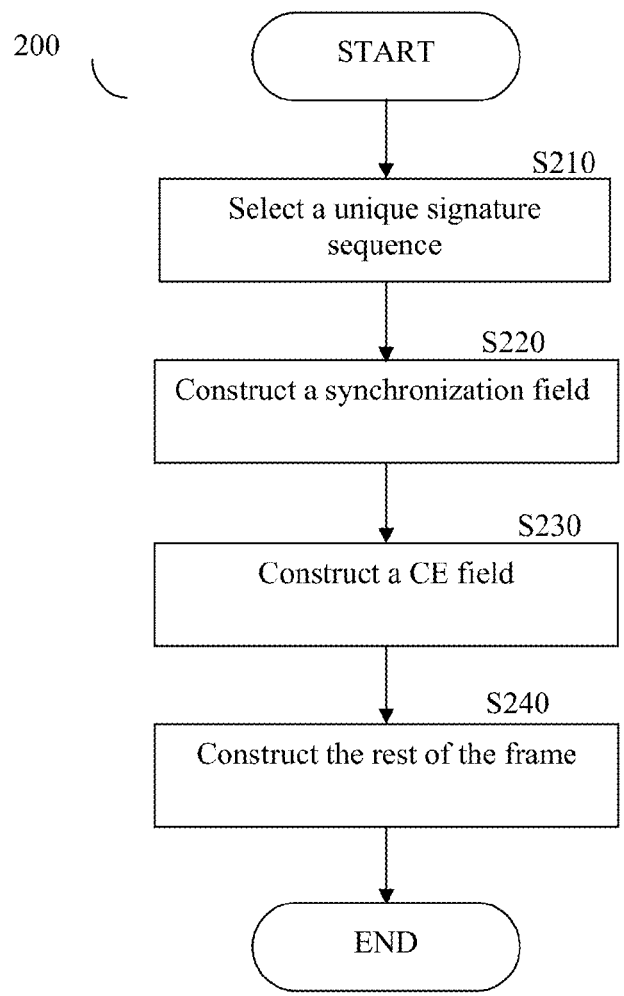
FIG. 2 is a flowchart for signaling the transmission mode implemented in accordance with an embodiment of the invention.

FIG. 2 shows an exemplary and non-limiting flowchart 200 for signaling the transmission mode implemented in accordance with an embodiment of the invention. The method provides a mechanism that implicitly informs a receiving device of the transmission mode, thereby enabling co-existence of wireless devices with multiple antennas and wireless devices with single antennas in wireless networks. In the context of the present disclosure, the transmission mode indicates whether a transmitting device transmits signals using a single antenna or multiple antennas and the specific multiple antenna transmission scheme employed by the transmitting device.

At S210, a unique signature sequence identifying the transmission mode is selected from a predefined set of signature sequences. A transmission mode and transmission scheme are associated with a unique signature sequences. For example, a unique signature sequence is generated for each of the following: a single antenna transmission mode, a multiple antenna transmission mode utilizing a transmit beam forming scheme, a multiple antenna transmission mode a utilizing STBC scheme, and a multiple antenna transmission mode utilizing a FITD scheme. These signature sequences are known a priori to the receiving device. In an embodiment of the invention, the signature sequences are generated in the form of pseudo-random (PN) sequences, which are characterized by good auto-correlation properties.

At S220, for each antenna in the transmitting device, the synchronization field 111 of the PLCP preamble 110 is constructed to include the selected unique signature sequence. The number of transmitted frames 100, hence the number of PLCP preambles 110, is the same as the number of antennas in the transmitting device. In each transmitted frame 100, the synchronization field 111 is generated by repeating the signature sequence multiple times. The repeated signature sequence results in a short training sequence. Detailed examples for generating the synchronization field 110 for the different transmission modes are provided below.

At S230, the CE field 112 of the PLCP preamble 110 is constructed to include a long training sequence. This step includes generating a long training sequence and positioning the sequence in the CE field 112 according to the number of symbols that the CE field 112 is comprised of. Examples for the execution of S230 are provided below.

At S240, the rest of the frame 100, i.e., PLCP header 120 and PSDU 130 is constructed. Thereafter, the transmitting device transmits the frame or frames using its single antenna or multiple antennas respectively. That is, if the transmitting device includes a number Q antennas, then Q frames are constructed and transmitted (Q is an integer number equal to or greater than 1).

A PLCP preamble 110, generated using the process described above, can be decoded by a receiving device to determine the transmission mode. In addition, the receiving device can detect the transmission scheme utilized for the multiple-antenna transmission mode, for example, transmit beam forming, STBC, or FITD. Specifically, the receiving device auto-correlates the received signal with a delayed version of the signal or cross-correlates the received signal with a reference signal.

The auto-correlation, at a time instance m, can be performed as follows:

$$\rho(m) = \sum_{p=0}^{P-1} r(m-p)r^*(m-N-p)$$

where 'p' is the correlation window size, 'r' represents a sampled baseband received signal, and 'r*' denotes the complex conjugate of 'r'. Thereafter, in order to identify the transmission mode, the receiving device performs a parallel correlation of the received signal with the different signature sequences that can be included in the synchronization field 111. For example, if 3 different signature sequences (SS1, SS2A, and SS2B) are predefined, the parallel correlation can be performed as follows:

$$\rho_1(m) = \sum_{n=0}^{N-1} r(m-n)SS1(n)$$

$$\rho_{2A}(m) = \sum_{n=0}^{N-1} r(m-n)SS2A(n)$$

$$\rho_{2B}(m) = \sum_{n=0}^{N-1} r(m-n)SS2B(n)$$

where N is a length of a correlation sequence.

A correlator with a maximum output value is selected and compared against a threshold to detect the presence of the signal and also to identify the transmission mode. For example, if the correlator $\rho_{2B}(m)$ outputs the maximum value, then the transmission mode is the mode corresponding to the signature sequence SS2B. Once the transmission mode is determined, then the receiving device sets the duration of the rest of the fields of the frame in order to correctly demodulate and decode the payload data 131.

Figure 3:
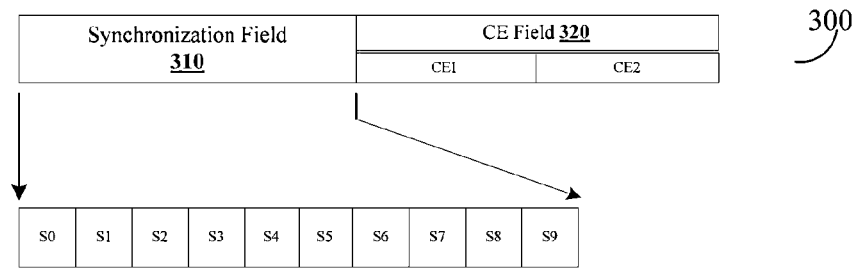
FIG. 3 is a diagram of a PLCP preamble to signal a single antenna transmission mode.

FIG. 3 shows an exemplary diagram of a PLCP preamble 300 to signal the single antenna transmission mode. A synchronization field 310 includes the short training sequence $S^0$ to $S^{M-1}$, where M is the number of repetitions of a signature sequence in the synchronization field 311. In an exemplary embodiment, the short training sequence is generated as follows:

$$S^i(n) = C_1^i \times SS1(n)$$

where i=0 to M−1 and n=0 to N−1; N is the length of the signature sequence SS1 corresponding to the antenna. Each element $S^0$ to $S^{M-1}$ in the short training sequence is of a length N. The values of N and M are predefined based on the length of the synchronization field 111. $C_1^i \in \{+1,-1\}$, i=0, 1, . . . , M−1 is a cover sequence and is used to uniquely identify the transmission mode, as well as to detect the beginning of the frame.

The channel estimation (CE) field 320 contains two symbols CE1 and CE2 (e.g., OFDM symbols), where the same long training sequence can be transmitted in both symbols CE1 and CE2. The receiving device averages the two received symbols to estimate the channel gain factors on each of the sub-carriers.

Figure 4:
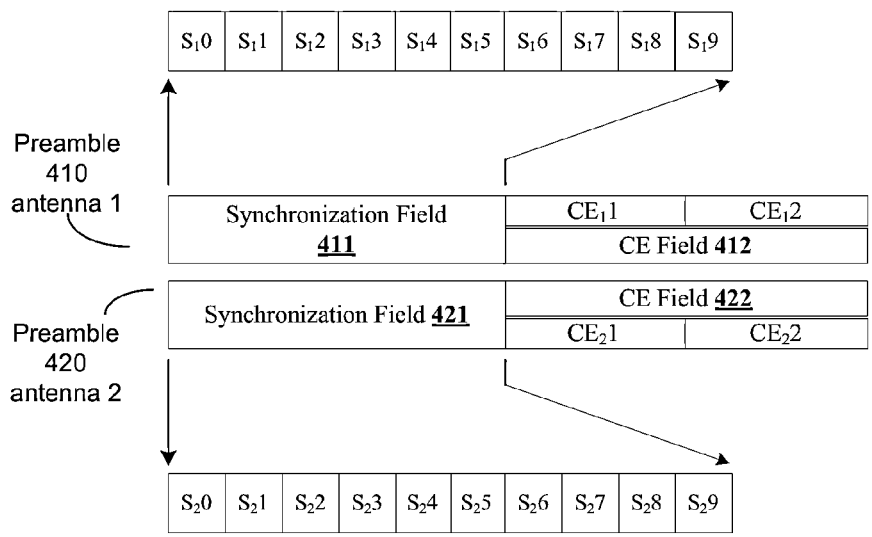
FIG. 4 is a diagram of PLCP preambles to signal a multiple antennas transmission mode.

FIG. 4 shows an exemplary diagram of PLCP preambles 410 and 420 to implicitly signal the dual-antenna transmission mode. Each antenna in a transmitting device (not shown) transmits a data frame that includes the PLCP preamble 410 or 420. A synchronization field 411 of the preamble 410 includes the short training sequence $S_1^0$ to $S_1^{M-1}$, where M is the number of repetitions of a respective signature sequence in the synchronization field 411. In an exemplary embodiment of the invention, the training sequence $S_1^0$ to $S_1^{M-1}$ is generated as follows:

$$S_1^i(n) = C_{2A}^i \times SS2A(n)$$

where, i=0 to M−1, n=0 to N−1 (N is the length of the signature sequence SS2A), and $C_{2A}^i \in \{+1,-1\}$; i=0, 1, . . . , M−1 is a cover sequence.

In this example, the signature sequence SS2A corresponds to a transmission scheme utilized by the two antennas of the transmitting device. For example, SS2A is the signature sequence respective of two antennas with transmit beam-forming, two antennas with STBC (e.g., Alamouti code), or two antennas with FITD.

A synchronization field 421 in the preamble 420 includes the same short training sequence $S_2^i(n)$, as of the symbols/ signals/training sequence $S_1^i(n)$ generated for the synchronization field 411. That is, $S_1^i(n)=S_2^i(n)$. Transmitting the same short training sequence in the two frames ensures a reliable burst detection and AGC setup at the receiving device. In accordance with an embodiment of the invention, a cyclic shifted version of the training sequence $S_1^i(n)$ is transmitted in the synchronization field 421.

It should be noted that the duration of the synchronization fields 311, 411 and 421 are the same. However, the CE fields 412 and 422 in a dual antenna transmission mode may be longer than the CE field 320. For example, a CE field of the dual antenna transmission mode can include 4 symbols.

In the preambles illustrated in FIG. 4, the CE fields 412 and 422 are transmitted by both the antennas in order to allow a receiving device to estimate and store channel estimates for each antenna transmission. In an exemplary embodiment, the CE field 412 includes two symbols CE1 and CE2, where the training sequence $S_1^i(n)$ is assigned to even sub-carriers during the first symbol duration (CE1) and assigned to odd sub-carriers during the second symbol duration (CE2). In CE field 422, this order is reversed, i.e., during the first symbol duration (CE1) a training sequence $S_2^i(n)$ is transmitted on odd sub-carriers and during the second symbol duration (CE2) the training sequence is transmitted on even sub-carriers. The receiving device performs interpolation over the two symbols to derive the channel estimate over the entire channel (i.e., all the sub-carriers).

When the CE field includes 4 symbols, then two symbols are transmitted as CE1 and CE2 and the other two symbols (CE3 and CE4) are copies of symbols CE1 and CE2. In this embodiment, a receiving device can average the channel estimates over two symbols, and the reliability of the channel estimates is similar to the one achieved with a single antenna transmission.

In accordance with another embodiment of the invention, a signaling method is provided to specify the transmission mode in a network that includes wireless devices with either a single antenna or wireless devices with two antennas. In this embodiment, the synchronization field 111 is used to denote the transmission mode, i.e., whether one or two transmit antennas are used. Specifically, the synchronization field 111 is generated based on the signature sequences as described in detail above. The CE field 112 is created by using pilots on only even sub-carriers in the first antenna and pilots on only odd sub-carriers from the second antenna. Thus, all receiving devices either with a single antenna or two antennas can receive the field 122.

According to this embodiment the transmission scheme is designated in the PLCP header 120. When multiple antennas are used, a header 120 is transmitted by each antenna, preferably using FITD. The PSDU 130 is transmitted using the transmission scheme set for the transmitting device. As illustrated in Table 1, two bits of the PLCP header 120 are set to designate the transmission scheme being used by the transmitting device. In an exemplary embodiment, the bits A0 and A1 occupy positions 14 and 15 in the PHY header in the PLCP header 120.

It should be noted that according to this embodiment, a transmitting device can use a spatial multiplexing (SM) scheme only if a destination receiving device also has two antennas. This can be determined, for example, by the short sequence used in the receiving device's beacon transmission.

TABLE 1

| Multiple antennae field bits A1-A0 | Multiple antennae transmission scheme |
|---|---|
| 00 | Single antenna |
| 01 | Frequency Interleaved Transmit Diversity (FITD) |
| 10 | Space Time Block Code (STBC) |
| 11 | Spatial Multiplexing (SM) |

The receiving device initially processes a received signal for burst detection. This is usually performed by correlating the received signal with a delayed version of the signal or with a reference signal. Then, the receiving device correlates the received signal with a plurality of correlators to determine the transmission mode. This process is described in greater detail above. If the receiving device determines that a frame is transmitted using a dual antenna mode, then the header is FITD decoded to derive the transmission scheme.

Various embodiments of the invention can be used with any packet-based communications systems using OFDM-like modulation schemes. For example, the teachings of the invention can be efficiently implemented in CogNeA based systems that utilize the Ecma-392 standard and the like.

Figure 5:
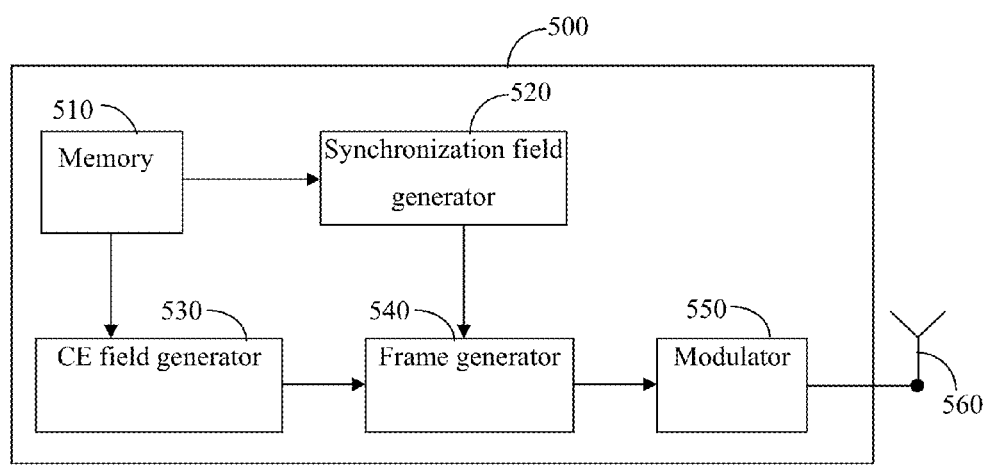
FIG. 5 is a block diagram of an apparatus in accordance with an embodiment of the invention.

FIG. 5 shows an exemplary and non-limiting block diagram of an apparatus 500 constructed in accordance with an embodiment of the invention. The apparatus 500 comprises a memory 510 for storing signature sequences respective of the different transmission modes and schemes, a synchronization field generator 520, a CE field generator 530, a frame generator 540, a modulator 550, and at least one antenna 560. The synchronization field generator 520 generates a short training sequence using a signature sequence retrieved from the memory 510. In one embodiment of the invention, the memory 510 can be replaced with a feedback loop shift register that generates signature sequences.

The CE field generator 530 forms the CE field of the PLCP preamble by generating a long training sequence and positioning the sequence in the CE field 112. In one embodiment of the invention, long training sequences are stored in the memory 510 and used by the CE field generator 530 to form the CE field. In another embodiment, the long training sequences are generated by the CE field generator 530. The frame generator 540 forms a PLCP frame for each transmit antenna 560 included in the apparatus. The PLCP preamble of a frame includes the synchronization and CE fields respectively constructed by the generators 520 and 530. Each frame outputted by the frame generator 540 is modulated by the modulator 550 according to a transmission scheme set for the apparatus 500. In an embodiment of the invention, the apparatus 500 may be integrated in a physical (PHY) layer module of a communication device.

The principles of the invention can be implemented as hardware, firmware, software or any combination thereof. Moreover, the software is preferably implemented as an application program tangibly embodied on a program storage unit, computer readable medium, or a non-transitory machine readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for signaling a transmission mode in a wireless communication network, comprising:
   selecting from a predefined set of signature sequences a signature sequence corresponding to the transmission mode;
   forming, for each antenna in the transmitting device, a synchronization field by repeating the selected signature sequence a predefined number of times to result in a short training sequence, wherein the synchronization field is included in a preamble; and
   transmitting, from each antenna in the transmitting device, a data frame that comprises the preamble.

2. The method of claim 1, wherein the signature sequence is further indicative of a transmission scheme of the transmitting device.

3. The method of claim 2, further comprising generating a long training sequence for a channel estimation field that is included in the preamble.

4. The method of claim 3, wherein the data frame further includes a header and a payload portion, the data frame being a physical layer convergence protocol (PLCP) frame.

5. The method of claim 1, further comprising:
   multiplying the selected signature sequence with a cover sequence used to uniquely identify the transmission mode and detect a beginning of the data frame.

6. The method of claim 1, wherein the signature sequence is a pseudo-random sequence.

7. The method of claim 2, wherein the transmission mode is a single antenna transmission or a multiple antennas transmission.

8. The method of claim 2, wherein the transmission scheme is any one of beam forming transmit diversity, frequency interleaved transmit diversity (FITD), spatial multiplexing, and space time block code (STBC).

9. The method of claim 1, further comprising forming, for each antenna in the transmitting device, a header for designating a transmission scheme of the transmitting device.

10. The method of claim 9, further comprising encoding the header using a FITD process.

11. An apparatus, comprising:
    a memory for storing at least one signature sequence corresponding to a transmission mode and a transmission scheme;
    a synchronization field generator for forming a synchronization field, for each antenna included in the apparatus, by repeating the at least one signature sequence retrieved from the memory a predefined number of times in a short training sequence, wherein the at least one signature sequence is selected from a predefined set of signature sequences and the short training sequence is included in the synchronization field;
    a channel estimation (CE) field generator for forming a CE field for each antenna by generating a long training sequence, wherein the synchronization field and CE field are included in a preamble;
    a frame generator for generating a data frame for each antenna, the data frame comprising the preamble; and
    a modulator for modulating each data frame using the transmission scheme set for the apparatus.

12. The apparatus of claim 11, further comprising a feedback loop shift register for generating the signature sequences.

13. The apparatus of claim 11, wherein the apparatus is integrated in a physical layer module of a wireless communication device.

* * * * *